United States Patent [19]

Register et al.

[11] Patent Number: 5,396,400
[45] Date of Patent: Mar. 7, 1995

[54] CONVERTIBLE COMPUTER APPARATUS ACTING AS A DESK-TOP COMPUTER OR A DOCKING STATION

[75] Inventors: David S. Register; Jon Thompson, both of Austin, Tex.

[73] Assignee: Dell USA, L.P., Austin, Tex.

[21] Appl. No.: 66,460

[22] Filed: May 20, 1993

[51] Int. Cl.⁶ .......................... H05K 7/10; G06F 1/16
[52] U.S. Cl. .................................. 361/686; 361/727; 439/377
[58] Field of Search .................. 439/377; 364/708.1; 312/223.2; 361/683–686, 725–727, 741, 756, 802

[56] References Cited

U.S. PATENT DOCUMENTS

5,159,533  10/1992  Kuang .................... 361/685
5,227,953   7/1993  Lindberg et al. ........ 361/683

Primary Examiner—Michael W. Phillips
Attorney, Agent, or Firm—James Huffman; Richard Konneker

[57] ABSTRACT

A computer system is provided that may be easily and relatively quickly converted between a stand-alone desktop configuration and a docking station configuration. The system includes a desktop computer housing having an external opening formed therein, and a plurality of associated computer peripheral devices such as a monitor and keyboard. A first electrical connector is supported within the computer and is electrically coupled to the peripheral devices. The system also includes a first motherboard having a second electrical connector supported thereon and electrically coupled thereto, and a notebook computer having a second motherboard therein and a third electrical connector supported thereon and electrically coupled thereto. Support rail structures are removably secured within the computer housing and extend inwardly from its external opening. The support rail structures have channel portions that slidably support opposite side edge portions of the first motherboard and the notebook computer and facilitate the operative interconnection between the first and second connectors when the first motherboard is inserted into the external computer housing opening to thereby couple the first motherboard to the peripheral devices, and facilitate the operative interconnection between the first and third connectors when the notebook computer is inserted into the external computer housing opening, in place of the first motherboard, to thereby couple the second motherboard to the peripheral devices.

17 Claims, 5 Drawing Sheets

CONVERTIBLE COMPUTER APPARATUS ACTING AS A DESK-TOP COMPUTER OR A DOCKING STATION

BACKGROUND OF THE INVENTION

The present invention generally relates to computer apparatus and, in a preferred embodiment thereof, more particularly relates to a computer device that may be easily and relatively quickly converted from a stand-alone desktop computer to a portable computer docking station and vice versa.

The adoption of a portable computer by a current desktop computer user poses several problems. The first problem has to do with the interchange of data between the desktop and portable computers. While desktop and portable computers are data compatible, the physical process of data transfer from one computer to the other can be cumbersome and time consuming, the process typically being effected using floppy disks or data transfer cables interconnected between the two computers.

A common solution to this data transfer inconvenience is provided by the use of a "docking station" in conjunction with the portable computer. A docking station is typically a desktop housing device that is operatively connected to the usual peripherals, such as a keyboard, mouse and monitor and has an opening into which the portable computer may be inserted into an operatively coupled relationship with the docking station. When the portable computer is so inserted, the docking station is temporarily converted, in effect, into a desktop computer that uses the portable computer motherboard to control the overall computer system and uses the docking station peripheral devices in place of those carried by or normally connectable to the portable computer.

This docking station approach to providing desktop size and convenience to the owner of a portable computer in addition to the on-the-road compactness and light weight of the portable computer when removed from the docking station essentially eliminates the previously mentioned data transfer problem. Once the portable computer is operatively plugged into the docking station the data stored in the portable computer is already "in" the resulting desktop system, and data stored in, for example, the hard drive portion of the docking station is coupled to the inserted portable computer via its internal motherboard. Additionally, the docking station typically provides increased internal storage and expansion capability over that normally incorporated in the portable computer.

Despite the various advantages provided by this docking station approach to providing a computer user with the advantages of both portable and desktop computing systems, the approach carries with it several limitations. For example, the upgrade path from a conventional desktop computer system to a portable computer/docking station system is not a particularly efficient one since the original desktop computer is not useable in the new portable computer/docking station system. It must be stored, sold, scrapped or given to another user. The new user is then potentially faced with the same future upgrade problem. In a business setting the problem exists with respect to whether to initially give a computer user a conventional desktop computer system or a portable computer/docking station system.

In view of the foregoing it can be seen that it would be desirable to provide a more efficient upgrade path from a desktop computer system to a portable computer/docking station system. It is accordingly an object of the present invention to provide improved computer apparatus that affords such an improved upgrade path.

SUMMARY OF THE INVENTION

In carrying out principles of the present invention, in accordance with a preferred embodiment thereof, computer apparatus is provided that may be easily and relatively quickly converted between a stand-alone desktop configuration and a docking station configuration.

The convertible computer apparatus comprises a computer housing having an external opening therein, and at least one computer peripheral device associated with the computer housing. A first electrical connector device is disposed within the interior of the computer housing in a spaced apart relationship with the external housing opening and is electrically coupled to the peripheral device. The apparatus also includes a first motherboard and a portable computer, representatively a notebook computer, having a second motherboard therein.

The first motherboard has a second electrical connector device supported thereon and electrically coupled thereto, the first motherboard being removably insertable into the computer housing, through its external opening, in a manner removably interengaging the first and second electrical connector devices to thereby electrically couple the first motherboard to the computer peripheral device and place the overall computer apparatus in its stand-alone desktop computer configuration.

The portable computer has a third electrical connector device carried thereon and electrically coupled to the second motherboard, and the portable computer is removably insertable into the computer housing through its external opening, in place of the first motherboard, in a manner removably interengaging the first and third electrical connector devices to thereby electrically couple the second motherboard to the peripheral device and convert the overall computer apparatus to its docking station configuration.

Preferably, the first connector device is a high data bandwidth pin-type connector plug, the second and third connector devices are high data bandwidth pin-type connector sockets, and the third connector device is recessed into the portable computer. Also, the first motherboard preferably has a cover plate member transversely secured to an outer side edge thereof, the cover plate member being configured and positioned to extend across and cover the external computer housing opening when the first motherboard is operatively inserted into the computer housing.

In a preferred embodiment of the convertible computer apparatus of the present invention the apparatus also comprises support means, securable within the interior of the computer housing and operative to (1) slidably support the first motherboard and align and facilitate the operable interconnection between the first and second electrical connector devices when the first motherboard is inserted into the interior of the computer housing through its external opening, and (2) slidably support the portable computer and align and facilitate the operable interconnection between the first and third electrical connector devices when the portable computer is inserted into the interior of the computer housing through its external opening.

Representatively, the computer housing external opening has opposite ends, and the housing has an internal chassis structure having generally parallel opposite side portions extending inwardly from such opposite opening ends, and an inner end portion extending transversely between the opposite side portions, the inner end portion facing and being spaced inwardly apart from the external housing opening. The first electrical connector device is secured to the inner end portion of the chassis structure and faces the external housing opening. The support means include a plurality of elongated support members removably securable to the opposite side portions of the chassis structure and have channels formed thereon for slidably receiving opposite side edge portions of the first motherboard and the portable computer.

In one form thereof the elongated support members include a first pair of elongated support members removably securable to the opposite side portions of the chassis structure and having first channels formed therein for slidably receiving the opposite side edge portions of the first motherboard, and a second pair of elongated support members removably securable to the opposite side portions of the chassis structure, interchangeably with the first pair of elongated support members, and having second channels formed therein for slidably receiving the opposite side edge portions of the portable computer.

In another form thereof the plurality of elongated support members include a single pair of elongated support members each having a first channel formed therein and configured to slidably receive one of the opposite side edge portions of the first motherboard, and a second channel formed therein and configured to slidably receive one of the opposite side edge portions of the portable computer.

DETAILED DESCRIPTION

Figure 1:
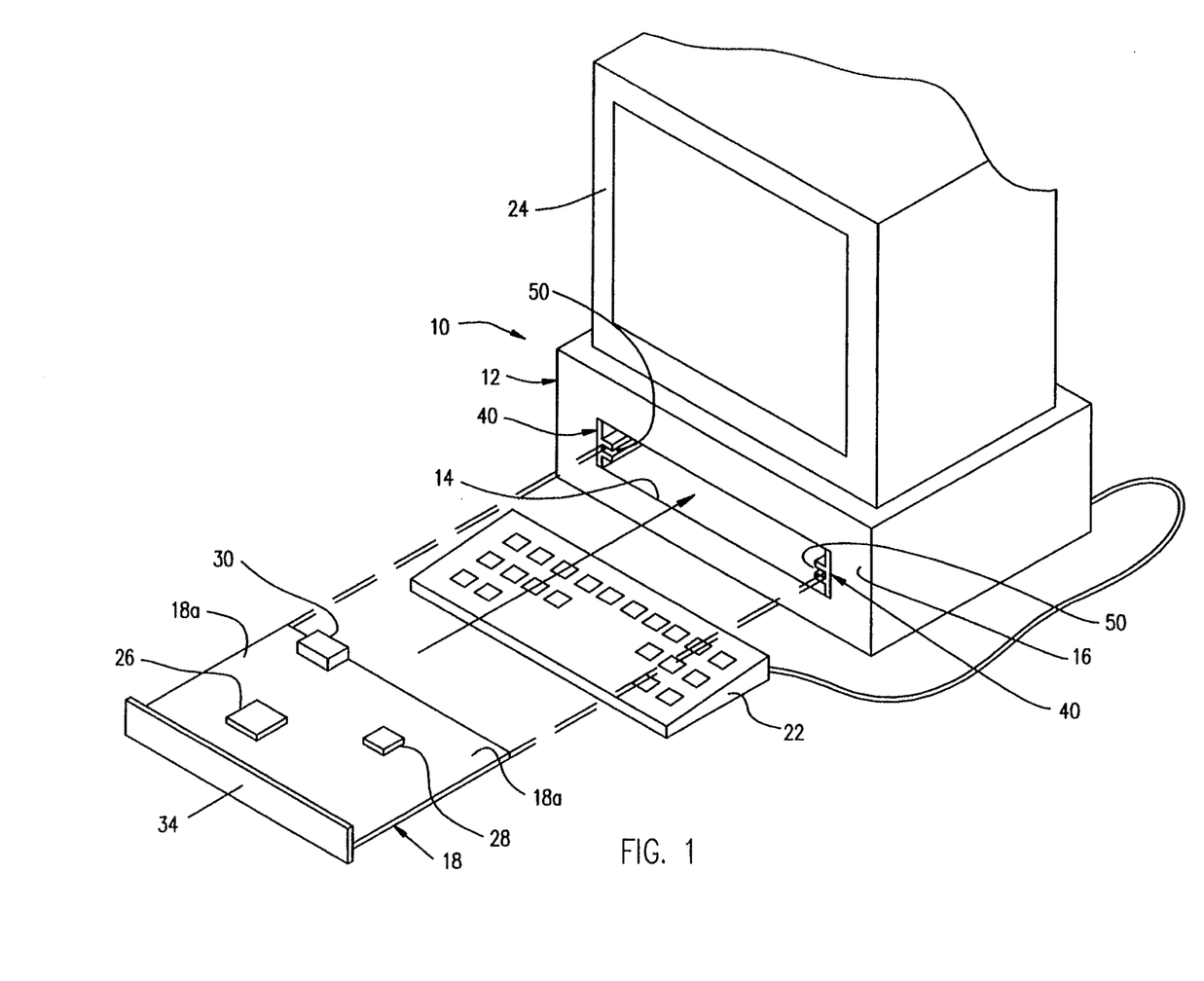
FIG. 1 is a partially exploded, somewhat schematic perspective view of specially designed convertible computer apparatus embodying principles of the present invention, the apparatus being illustrated in its stand-alone desktop computer configuration.
Figure 3:
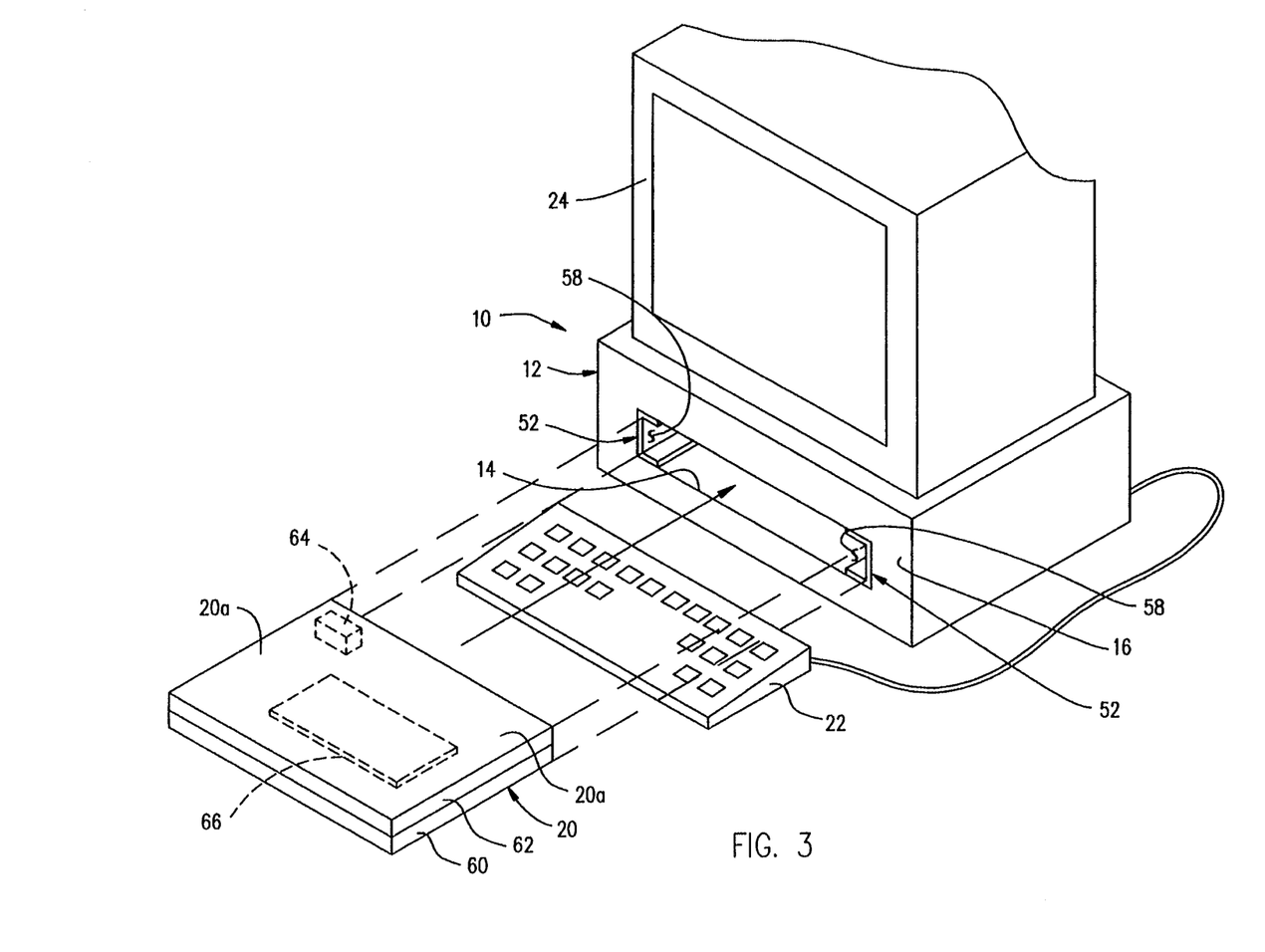
FIG. 3 is a view of the convertible computer apparatus similar to that in FIG. 1, but with the apparatus having been converted to its portable computer/docking station configuration.

Referring initially to FIGS. 1 and 3, the present invention provides specially designed computer apparatus 10 that is uniquely convertible between a stand-alone desktop computer configuration shown in FIG. 1 and a portable computer/docking station shown in FIG. 3. In its illustrated preferred embodiment the convertible computer apparatus 10 includes a desktop computer housing 12 having a horizontally elongated rectangular opening 14 formed in its front side wall 16, a removable motherboard or system planar board 18 (see FIG. 1), and a portable notebook computer 20 (see FIG. 3).

Conventional desktop peripheral devices, such as the illustrated keyboard 22 and monitor 24 are operatively coupled to the internal components within the computer housing 12, and other peripheral components, such as a mouse and a printer, may be similarly connected to such internal housing components via the usual housing ports (not illustrated).

Figure 2:
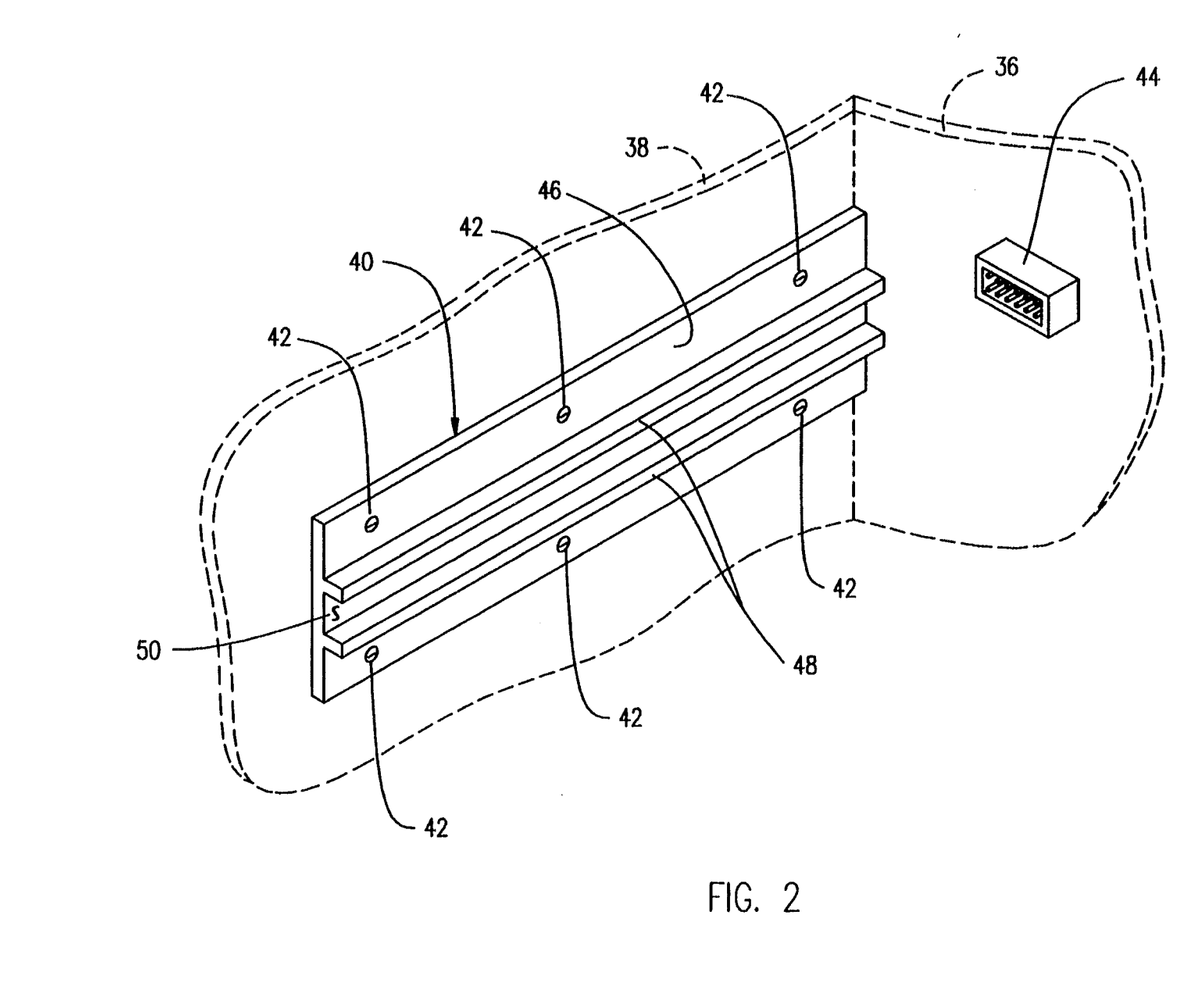
FIG. 2 is an enlarged scale interior perspective view of a computer housing portion of the apparatus and illustrates an motherboard support rail and an associated high bandwidth connector supported within the housing.

Referring now to FIGS. 1 and 2, the motherboard 18 carries the usual operating components, such as the schematically illustrated central processing and memory chips 26 and 28. For purposes later described, a high data bandwidth pin-type connector socket 30 is secured to the motherboard 18 at its rear side edge 32. A horizontally elongated rectangular cover plate 34 is transversely secured to the front side edge of the motherboard 18 and is sized to extend across and cover the housing opening 14 when the motherboard 18 is rearwardly inserted into the housing 12 as later described.

Disposed within the housing 12 (see FIG. 2) is a chassis structure having a rear end portion 36 which is spaced rearwardly apart from and opposes the housing opening 14, and a spaced pair of opposite side portions 38 (only one of which is illustrated) that extend rearwardly from the opposite ends of the housing opening 14 to the rear chassis portion 36. A pair of elongated support rail members 40 are removably secured to the chassis side portions 38 by screws 42 and longitudinally extend rearwardly from adjacent the opposite ends of the housing opening 14. A high data bandwidth pin-type connector plug 44, configured to be operatively and removably received in the connector socket 30, is secured to the chassis end portion 36 and is electrically coupled to the various internal components within the housing 12.

Each of the support rail members 40 has a rectangular base portion 46 from which a spaced pair of parallel rib portions 48 laterally project, each pair of ribs 48 forming therebetween a channel 50 configured to slidingly receive opposite side edge portions 18a of the motherboard 18. To removably install the motherboard 18 in the housing 14, thereby bringing the convertible computer apparatus 10 to its stand-alone desktop configuration, the motherboard edge portions 18a are simply inserted into the front ends of the rib channels 50, and the motherboard 18 is pushed rearwardly into the housing opening 14 until the plug 44 operatively enters the board socket 30 and the cover plate 34 extends across the housing opening 40. The relative positioning of the connector socket and plug members 30 and 44 is, of course, predetermined to permit their operative interengagement in response to this sliding insertion of the motherboard 18 into the computer housing 12.

Figure 4:
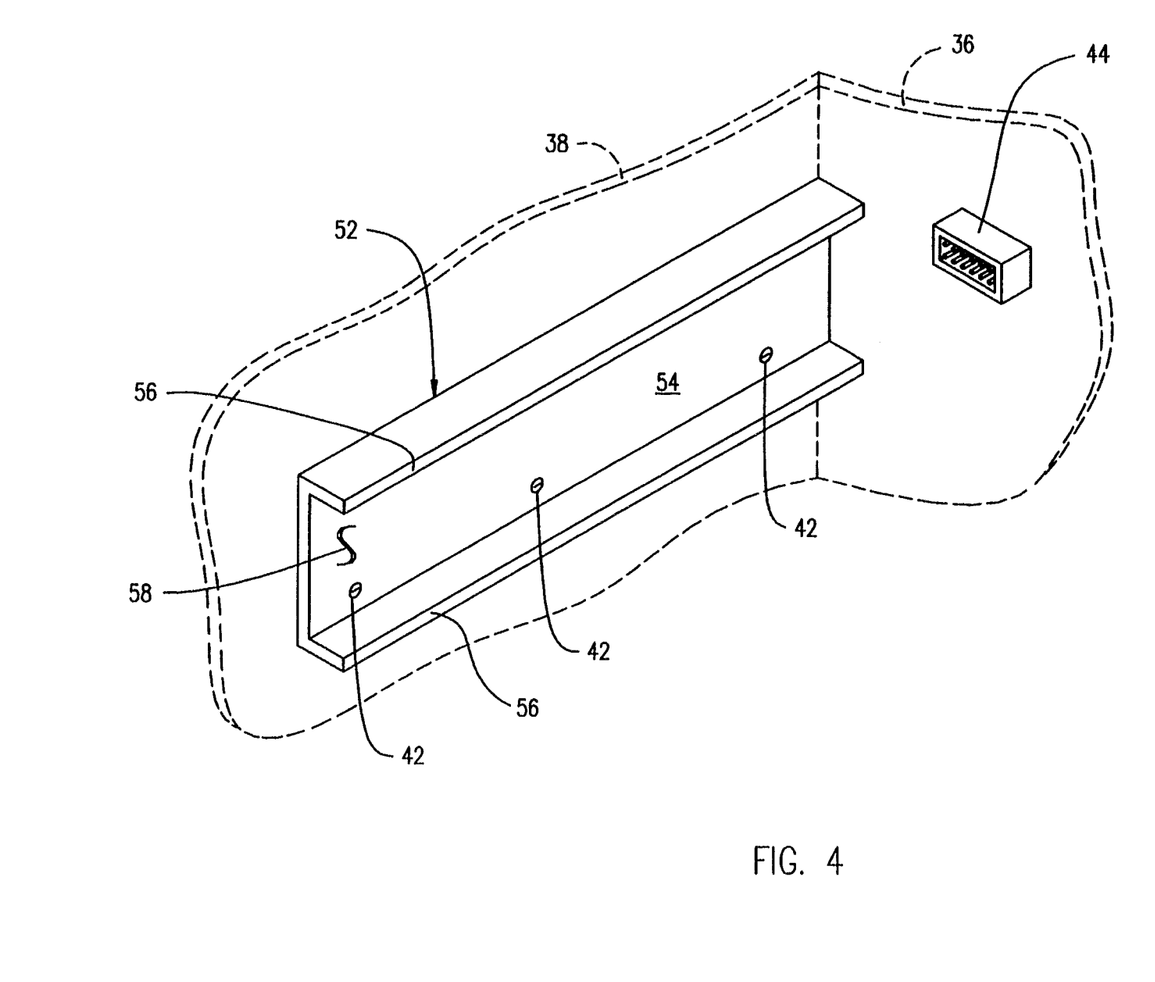
FIG. 4 is an enlarged scale interior perspective view of the computer housing and illustrates; a portable computer support rail installed therein in place of the motherboard support rail shown in FIG. 2.

Referring now to FIGS. 3 and 4, to subsequently upgrade the convertible computer apparatus 10 to its portable computer/docking station configuration, the motherboard 18 is simply pulled forwardly out of the housing 14, thereby uncoupling the stationary connector plug 44 from its associated motherboard connector socket 30. The motherboard support rail members 40 are then removed and replaced with a pair of differently configured support rail members 52 secured to the opposite chassis side portions 38 with the screws 42. Each of the support rail members 52 has an elongated rectangular body portion 54 having, along its top and bottom side edges, a pair of laterally projecting flange portions 56. Each associated pair of flanges 56 forms therebetween a channel 58 that is vertically sized to slidingly receive opposite side edge portions 20a of the notebook computer 20.

Notebook computer 20 is of a generally conventional, relatively thin rectangular configuration and has the usual base portion 60 to which a lid portion 62 is pivotally secured along a rear side edge portion of the computer. Disposed along a rear side edge portion of the lid portion 62 is a recessed, high data bandwidth pin-type connector socket 64 positioned and configured to operatively and removably receive the stationary connector plug 44 when the portable computer 20 is slid into the interior of the computer housing 12 as will now be described.

To install the notebook computer 20 in the housing 12 (which, with the motherboard 18 removed, now serves as a docking station), the rear end of the closed computer 20 is simply inserted into the housing opening 14 so that the opposite computer side edge portions 20a are slidably received in the support member channels 58. The notebook computer 20 is then pushed rearwardly through the interior of the housing 14 until the connector plug 44 is operatively received in the notebook computer connector socket 64. This operatively couples the dedicated motherboard 66 of the notebook computer 20 to the balance of the docking station computer system via the connector plug 44. The motherboard 66 now controls the overall desktop computer system in place of the previously removed motherboard 18.

Figure 5:
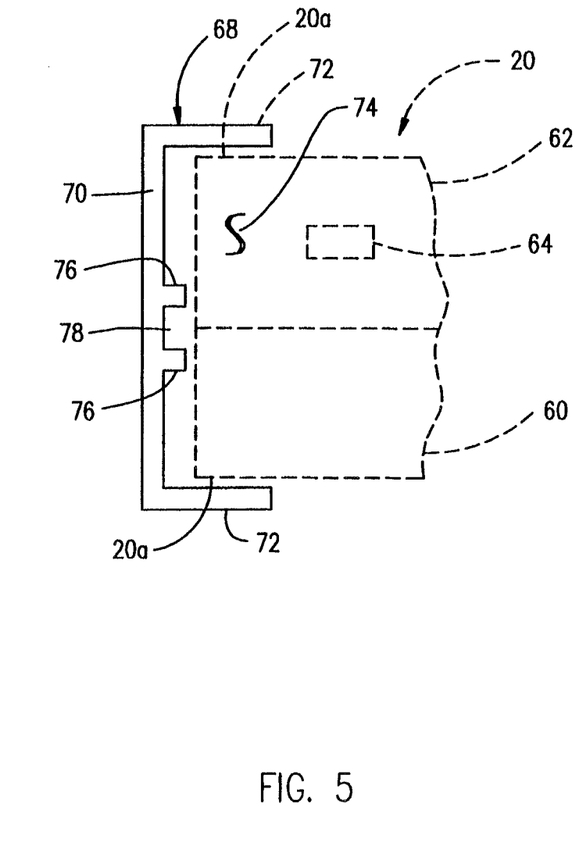
FIG. 5 is an enlarged scale schematic end view of a combination motherboard/portable computer support rail that may be used in place of the separate support rails shown in FIGS. 2 and 4.

Illustrated in FIG. 5 is one of a pair of alternate support channel members 68 that may be used in place of the interchangeable support channel member pairs 40 and 52 described above. Support channel 68 has an elongated body portion 70 that may be removably secured to one of the chassis side wall portions 38 using the screws 42, a pair of top and bottom transverse side edge flanges 72 forming therebetween a channel 74, and a pair of considerably shorter central flanges 76 forming therebetween a channel 78.

The channel 78 is sized to slidably and removably receive the opposite side edge portions 18a of the motherboard 18 and position the motherboard connector socket 30 to operatively receive the stationary computer housing connector plug 44 when the motherboard 18 is operatively inserted into the computer housing opening 14. In a similar manner, the channel 74, as illustrated in FIG. 5, is sized to slidingly receive the opposite side edge portions 20a of the portable computer 20, and position its socket 64 to operatively receive the computer housing plug 44 when the portable computer 20 is operatively inserted into the opening 14 in place of the removed motherboard 18. As illustrated, the inner side edges of the flanges 76 engage and stabilize the side portions 20a of the portable computer 20, as do the vertically facing inner side surfaces of the flanges 72.

As can readily be seen, the present invention provides an easy and relatively rapid upgrade path for converting the computer apparatus 10 from its stand-alone desktop configuration shown in FIG. 1, and its docking station configuration shown in FIG. 3, and vice versa, by simply selecting which of the two motherboards 18 and 66 is to be used to control the operation of the overall computing system and inserting or removing the motherboard 18 as necessary to accommodate the configuration choice. An additional advantage is provided in that if the portable computer goes down for some reason, the motherboard 18 may simply be replaced in the computer housing 12 to reconvert the apparatus, at least temporarily, to a stand-alone desktop computing system.

The foregoing detailed description is to be clearly understood as being given by way of illustration and example only, the spirit and scope of the present invention being limited solely by the appended claims.

What is claimed is:

1. Convertible computer apparatus comprising:
   a computer housing having an external opening therein;
   at least one computer peripheral device;
   a first electrical connector device disposed within the interior of said computer housing in a spaced apart relationship with said external opening, said first electrical connector device being electrically coupled to said at least one computer peripheral device;
   a first motherboard having a second electrical connector device supported thereon and electrically coupled thereto, said first motherboard being removably insertable into said computer housing, through said external opening, in a manner removably interengaging said first and second electrical connector devices to thereby electrically couple said first motherboard to said at least one computer peripheral device; and
   a portable computer having a second motherboard therein and a third electrical connector device carried thereon and electrically coupled to said second motherboard, said portable computer being removably insertable into said computer housing through said external opening, in place of said first motherboard, in a manner removably interengaging said first and third electrical connector devices to thereby electrically couple said second motherboard to said at least one computer peripheral device.

2. The convertible computer apparatus of claim 1 further comprising:
   support means, securable within the interior of said computer housing, for:
   slidably supporting said first motherboard and aligning and facilitating the operable interconnection between said first and second electrical connector devices when said first motherboard is inserted into the interior of said computer housing through said external opening, and
   slidably supporting said portable computer and aligning and facilitating the operable interconnection between said first and third electrical connector devices when said portable computer is inserted into the interior of said computer housing through said external opening.

3. The convertible computer apparatus of claim 2 wherein:
   said external opening has opposite ends,
   said computer housing has a chassis structure therein, said chassis structure having generally parallel opposite side portions extending inwardly from said opposite ends of said external opening, and an inner end portion extending transversely between said opposite side portions, said inner end portion facing and being spaced inwardly apart from said external opening, said first electrical connector device is secured to said inner end portion and faces said external opening, each of said first motherboard and said portable computer has a pair of opposite side edge portions, and said support means include a plurality of elongated support members removably securable to said opposite side portions of said chassis structure and having channels formed thereon for slidably receiving said opposite side edge portions of said first motherboard and said portable computer.

4. The convertible computer apparatus of claim 3 wherein said plurality of elongated support members include:

a first pair of elongated support members removably securable to said opposite side portions of said chassis structure and having first channels formed therein for slidably receiving said opposite side edge portions of said first motherboard, and a second pair of elongated support members removably securable to said opposite side portions of said chassis structure, interchangeably with said first pair of elongated support members, and having second channels formed therein for slidably receiving said opposite side edge portions of said portable computer.

5. The convertible computer apparatus of claim 3 wherein said plurality of elongated support members include:

a single pair of elongated support members each having a first channel formed therein and configured to slidably receive one of said opposite side edge portions of said first motherboard, and a second channel formed therein and configured to slidably receive one of said opposite side edge portions of said portable computer.

6. The convertible computer apparatus of claim 1 wherein:

said portable computer is a notebook computer.

7. The convertible computer apparatus of claim 1 wherein:

said first, second and third electrical connector devices are high data bandwidth electrical connector devices.

8. The convertible computer apparatus of claim 1 wherein:

said first, second and third electrical connector devices are pin-type connector devices.

9. The convertible computer apparatus of claim 1 wherein:

said first electrical connector device has a plug configuration, said second and third electrical connector devices have socket configurations, and said third electrical connector device is recessed into said portable computer.

10. The convertible computer apparatus of claim 1 wherein:

said first electrical connector device is a high data bandwidth pin-type connector plug, said second and third electrical connector devices are high data bandwidth pin-type socket connectors, and said third electrical connector device is recessed into said portable computer.

11. The convertible computer apparatus of claim 1 further comprising:

a cover plate member transversely secured to an edge portion of said first motherboard, said cover plate member being configured and positioned to extend across and cover said external opening when said first motherboard is operatively inserted into said computer housing.

12. Computer apparatus convertible between a stand-alone desktop configuration and a docking station configuration, comprising:

a desktop computer housing having an external opening formed therein;

a plurality of desktop computer peripheral devices;

a first high data bandwidth electrical connector device stationarily supported within the interior of said desktop computer housing and facing said external opening in an inwardly spaced apart relationship therewith, said first electrical connector device being electrically coupled to said plurality of desktop computer peripheral devices;

a first motherboard having a second high data bandwidth connector device supported thereon, for movement therewith, and electrically coupled thereto, said first motherboard further having opposite side edge portions and being removably insertable into said desktop computer housing, through said external opening, in a manner removably interengaging said first and second electrical connector devices to thereby electrically couple said first motherboard to said plurality of desktop computer peripheral devices;

a notebook computer having a second motherboard therein and a third high data bandwidth electrical connector device supported thereon, for movement therewith, and electrically coupled to said second motherboard, said portable computer having opposite side edge portions and being removably insertable into said desktop computer housing through said external opening, in place of said first motherboard, in a manner removably interengaging said first and third electrical connector devices and electrically coupling said second motherboard to said plurality of desktop computer peripheral devices; and support means, securable within the interior of said desktop computer housing, for:

slidably supporting said first motherboard and aligning and facilitating the operable interconnection between said first and second electrical connector devices when said first motherboard is inserted into the interior of said desktop computer housing through said external opening, and slidably supporting said notebook computer and aligning and facilitating the operable interconnection between said first and third electrical connector devices when said notebook computer is inserted into the interior of said desktop computer housing through said external opening.

13. The computer apparatus of claim 12 wherein:

said external opening has opposite ends, said desktop computer housing has a chassis structure therein, said chassis structure having generally parallel opposite side portions extending inwardly from said opposite ends of said external opening, and an inner end portion extending transversely between said opposite side portions, said inner end portion facing and being spaced inwardly apart from said external opening, said first electrical connector device is secured to said inner end portion and faces said external opening, and said support means include a plurality of elongated support members removably securable to said opposite side portions of said chassis structure and having channels formed thereon for slidably receiving said opposite side edge portions of said first motherboard and said notebook computer.

14. The computer apparatus of claim 13 wherein said plurality of elongated support members include:

a first pair of elongated support members removably securable to said opposite side portions of said chassis structure and having first channels formed therein for slidably receiving said opposite side edge portions of said first motherboard, and a second pair of elongated support member removably securable to said opposite side portions of said chassis structure, interchangeably with said first pair of elongated support members, and having second channels formed therein for slidably receiving said opposite side edge potions of said notebook computer.

15. The computer apparatus of claim 13 wherein said plurality of elongated support members include:

a single pair of elongated support members each having a first channel formed therein and configured to slidably receive one of said opposite side edge portions of said first motherboard, and a second channel formed therein and configured to slidably receive one of said opposite side edge portions of said notebook computer.

16. The computer apparatus of claim 12 wherein:

said first electrical connector device has a plug configuration, said second and third electrical connector devices have socket configurations, and said third electrical connector device is recessed into said notebook computer.

17. The computer apparatus of claim 16 wherein:

said first, second and third electrical connector devices are pin-type connector devices.

* * * * *